No. 781,703. PATENTED FEB. 7, 1905.
E. R. WILSON.
CATTLE TIE.
APPLICATION FILED FEB. 25, 1904.
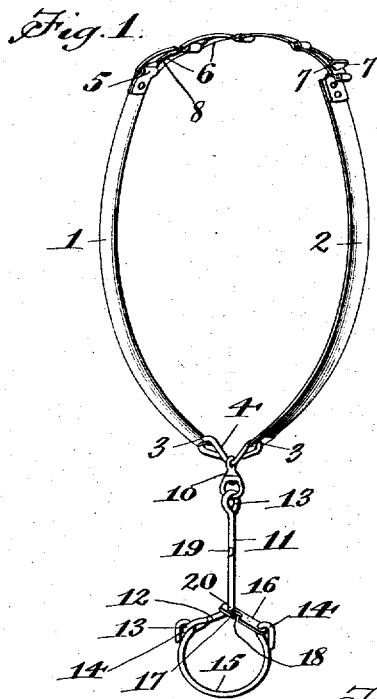
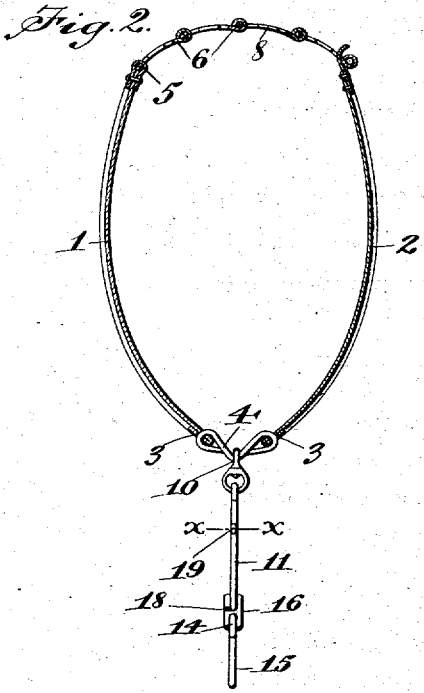
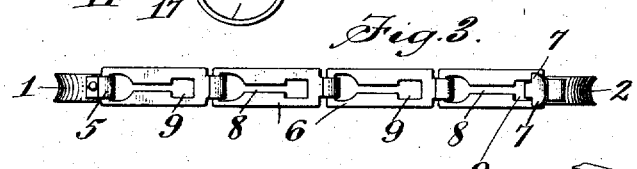
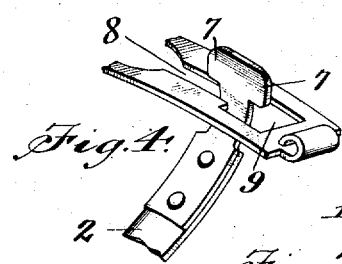
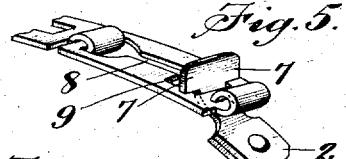
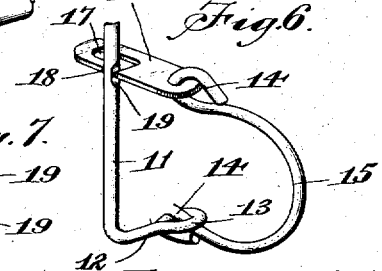
Witnesses:
B. Mason
Julius Lankes
Edgerton R. Wilson, Inventor.
By Neuhart & Burkhart,
Attorneys.

No. 781,703.

Patented February 7, 1905.

UNITED STATES PATENT OFFICE.

EDGERTON R. WILSON, OF ST. CATHERINES, CANADA.

CATTLE-TIE.

SPECIFICATION forming part of Letters Patent No. 781,703, dated February 7, 1905.

Application filed February 25, 1904. Serial No. 195,220.

*To all whom it may concern:*

Be it known that I, EDGERTON R. WILSON, a subject of the King of Great Britain, and a resident of St. Catherines, in the Province of Ontario, Canada, have invented certain new and useful Improvements in Cattle-Ties, of which the following is a specification.

My invention relates to cattle-ties; and its object is to provide a simple, durable, and inexpensive tie which is effective in its purpose and which is adjustable to properly fit onto any animal's neck.

To this end the invention consists in the novel construction, arrangement, and combination of parts to be hereinafter described, and particularly pointed out in the appended claims.

In the drawings, Figure 1 is a perspective view of my improved cattle-tie. Fig. 2 is a longitudinal sectional elevation of the same. Fig. 3 is an enlarged top plan view. Fig. 4 is a perspective view of one end of one of the side bars and the end link of the series of connecting-links, showing the manner of connecting the links with the said side bar. Fig. 5 is a perspective view, slightly reduced in scale, showing the hooked free end of one of the side bars connected to the end link. Fig. 6 is an enlarged perspective view of the tie-loop, showing the manner of connecting the lock-bar of the loop to the bar connecting said loop with the side bars. Fig. 7 is an enlarged section taken on line $x\,x$, Fig. 2. Fig. 8 is an enlarged cross-section of one of the side bars.

Referring to the drawings in detail, like numerals of reference refer to like parts in the several figures.

The numerals 1 2 designate the side bars of the tie, which are curved to conform to the shape of the animal's neck. Each bar is formed of suitable sheet-metal stamped concavo-convex in cross-section, and the lower end of each bar is provided with an aperture 3. A link 4 is passed through said apertures and connects the lower ends of the side bars.

The upper end of the side bar 1 is provided with a loop 5, through which is passed one of the end links of a series of connected links 6. The upper end of the other side bar, 2, is provided with lateral projections 7, which form, in effect, a double hook. The links are each provided with a slot 8, having that end nearest the double hook enlarged, as at 9, forming substantially a T-shaped slot. The narrow portion of each slot is slightly wider than the thickness of the metal forming the double hook, while the enlarged end is of a width to accommodate the width of said hook adjacent the projections 7 thereof. By this construction the hooked end of the side bar 2 may be passed through the slot of any one link and drawn toward the enlarged end of said slot, as shown in Fig. 4, when on giving the bar a quarter-turn the lateral projections 7, forming the hook, bear against the outer face of the link and lock the latter and the bar 2 together, as shown in Fig. 5.

Secured to the link 4 at the lower ends of the side bars is a swivel 10, and attached to said swivel is a bar 11, having its lower end bent at an angle, as at 12. Each end of said bar is bent upon itself to form an eye 13 for connection respectively with the said swivel and one of two lopped ends 14 of a U-shaped member 15. To the opposite looped end of said U-shaped member I secure a lock-bar 16, having a slot 17, with a laterally-opening portion 18 at one end of said slot, forming, substantially, an L-shaped opening. The bar 11 is notched at opposite faces, as at 19, to reduce the thickness of the bar, and in connecting the lock-bar to the bar 11 the laterally-opening portion of the slot, which is narrower than the main portion thereof, is brought into registration with the reduced portion 19 of the said bar, which latter is then forced into the said slot, and as it reaches the wider or longitudinal portion of the said slot the lock-bar may be drawn downward until it comes in contact with the angle 20 in said bar.

Having thus described my invention, what I claim is—

1. A cattle-tie comprising two curved side bars concavo-convex in cross-section and connected at their lower ends, an adjustable connection between the upper ends of said side bars, and suitable means of attachment to any object.

2. A cattle-tie comprising two curved side bars connected at their lower ends, one of said side bars having opposite lateral projections at its upper end to form a double hook, and a series of links connected to the other side bar, said double hook being adapted for engagement with any one of said links.

3. A cattle-tie comprising two curved side bars connected at their lower ends, a series of links connected to one of said side bars, each link having a slot enlarged at one end, and means on the other side bar for locking engagement with any one of said links.

4. A cattle-tie comprising two curved side bars connected at their lower ends, one of said side bars having lateral projections at its upper end to form a double hook, and a series of links connected to the other side bar, each link having a slot enlarged at one end, and said double hook being adapted for engagement with the slot in any one of said links.

5. A cattle-tie comprising two curved bars connected at their lower ends, one of said bars having a loop at its upper end and the other bar having lateral projections forming a hooked end, a series of connected links having one of the end links of the series connected to the loop at the upper end of one of said side bars, each link having a slot enlarged at one end and with any one of which the hooked end of the other side bar is adapted to engage and means for attachment to any suitable object.

6. A cattle-tie comprising two curved side bars concavo-convex in cross-section, each bar having a perforation in its lower end, a link passing through said perforations and connecting the lower ends of said bars, and an adjustable connection at the upper ends of said bars.

7. A cattle-tie comprising two curved side bars concavo-convex in cross-section, one of said bars having a loop at its upper end and a perforation at its lower end, and the other bar having opposite lateral extensions at its upper end and a perforation at its lower end, a link passing through the perforated lower ends of said bars, and a series of links connecting the upper ends of said bars, one end link of the series being secured in the aforesaid loop on one side bar, and the said lateral extensions on the other side bar being adapted for engagement with any one of said links.

In testimony whereof I have affixed my signature in the presence of two subscribing witnesses.

EDGERTON R. WILSON.

Witnesses:
M. J. McCARRON,
F. H. WILSON.

---

Correction in Letters Patent No. 781,703.

It is hereby certified that in Letters Patent No. 781,703, granted February 7, 1905, upon the application of Edgerton R. Wilson, of St. Catherines, Canada, for an improvement in "Cattle-Ties," an error appears in the printed specification requiring correction, as follows: In line 74, page 1, the word "lopped" should read *looped;* and that the said Letters Patent should be read with this correction therein that the same may conform to the record of the case in the Patent Office.

Signed and sealed this 21st day of February, A. D., 1905.

[SEAL.]

F. I. ALLEN,
*Commissioner of Patents.* side bars having opposite lateral projections at its upper end to form a double hook, and a series of links connected to the other side bar, said double hook being adapted for engagement with any one of said links.

3. A cattle-tie comprising two curved side bars connected at their lower ends, a series of links connected to one of said side bars, each link having a slot enlarged at one end, and means on the other side bar for locking engagement with any one of said links.

4. A cattle-tie comprising two curved side bars connected at their lower ends, one of said side bars having lateral projections at its upper end to form a double hook, and a series of links connected to the other side bar, each link having a slot enlarged at one end, and said double hook being adapted for engagement with the slot in any one of said links.

5. A cattle-tie comprising two curved bars connected at their lower ends, one of said bars having a loop at its upper end and the other bar having lateral projections forming a hooked end, a series of connected links having one of the end links of the series connected to the loop at the upper end of one of said side bars, each link having a slot enlarged at one end and with any one of which the hooked end of the other side bar is adapted to engage and means for attachment to any suitable object.

6. A cattle-tie comprising two curved side bars concavo-convex in cross-section, each bar having a perforation in its lower end, a link passing through said perforations and connecting the lower ends of said bars, and an adjustable connection at the upper ends of said bars.

7. A cattle-tie comprising two curved side bars concavo-convex in cross-section, one of said bars having a loop at its upper end and a perforation at its lower end, and the other bar having opposite lateral extensions at its upper end and a perforation at its lower end, a link passing through the perforated lower ends of said bars, and a series of links connecting the upper ends of said bars, one end link of the series being secured in the aforesaid loop on one side bar, and the said lateral extensions on the other side bar being adapted for engagement with any one of said links.

In testimony whereof I have affixed my signature in the presence of two subscribing witnesses.

EDGERTON R. WILSON.

Witnesses:
M. J. McCARRON,
F. H. WILSON.

---

Correction in Letters Patent No. 781,703.

It is hereby certified that in Letters Patent No. 781,703, granted February 7, 1905, upon the application of Edgerton R. Wilson, of St. Catherines, Canada, for an improvement in "Cattle-Ties," an error appears in the printed specification requiring correction, as follows: In line 74, page 1, the word "lopped" should read *looped;* and that the said Letters Patent should be read with this correction therein that the same may conform to the record of the case in the Patent Office.

Signed and sealed this 21st day of February, A. D., 1905.

[SEAL.]

F. I. ALLEN,
*Commissioner of Patents.*

Correction in Letters Patent No. 781,703.

It is hereby certified that in Letters Patent No. 781,703, granted February 7, 1905, upon the application of Edgerton R. Wilson, of St. Catherines, Canada, for an improvement in "Cattle-Ties," an error appears in the printed specification requiring correction, as follows: In line 74, page 1, the word "lopped" should read *looped;* and that the said Letters Patent should be read with this correction therein that the same may conform to the record of the case in the Patent Office.

Signed and sealed this 21st day of February, A. D., 1905.

[SEAL.]

F. I. ALLEN,
*Commissioner of Patents.*